Nov. 5, 1963  R. G. HEYL, JR  3,109,622
POWER SEAT TRACK HAVING HORIZONTAL AND VERTICAL MOVEMENT
Filed May 17, 1954  3 Sheets-Sheet 2
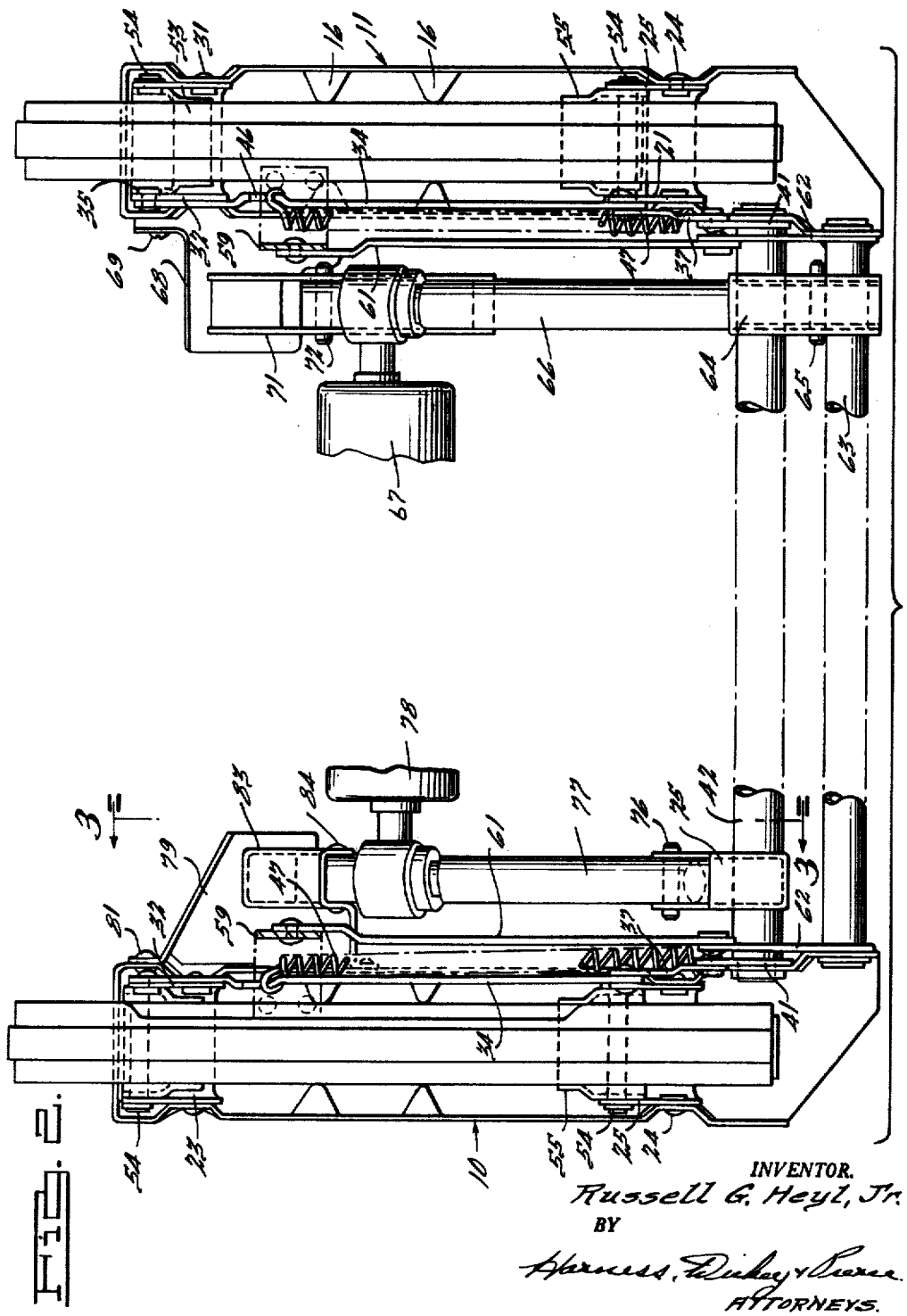
INVENTOR.
Russell G. Heyl, Jr.
BY
Harness, Dickey & Pierce
ATTORNEYS.

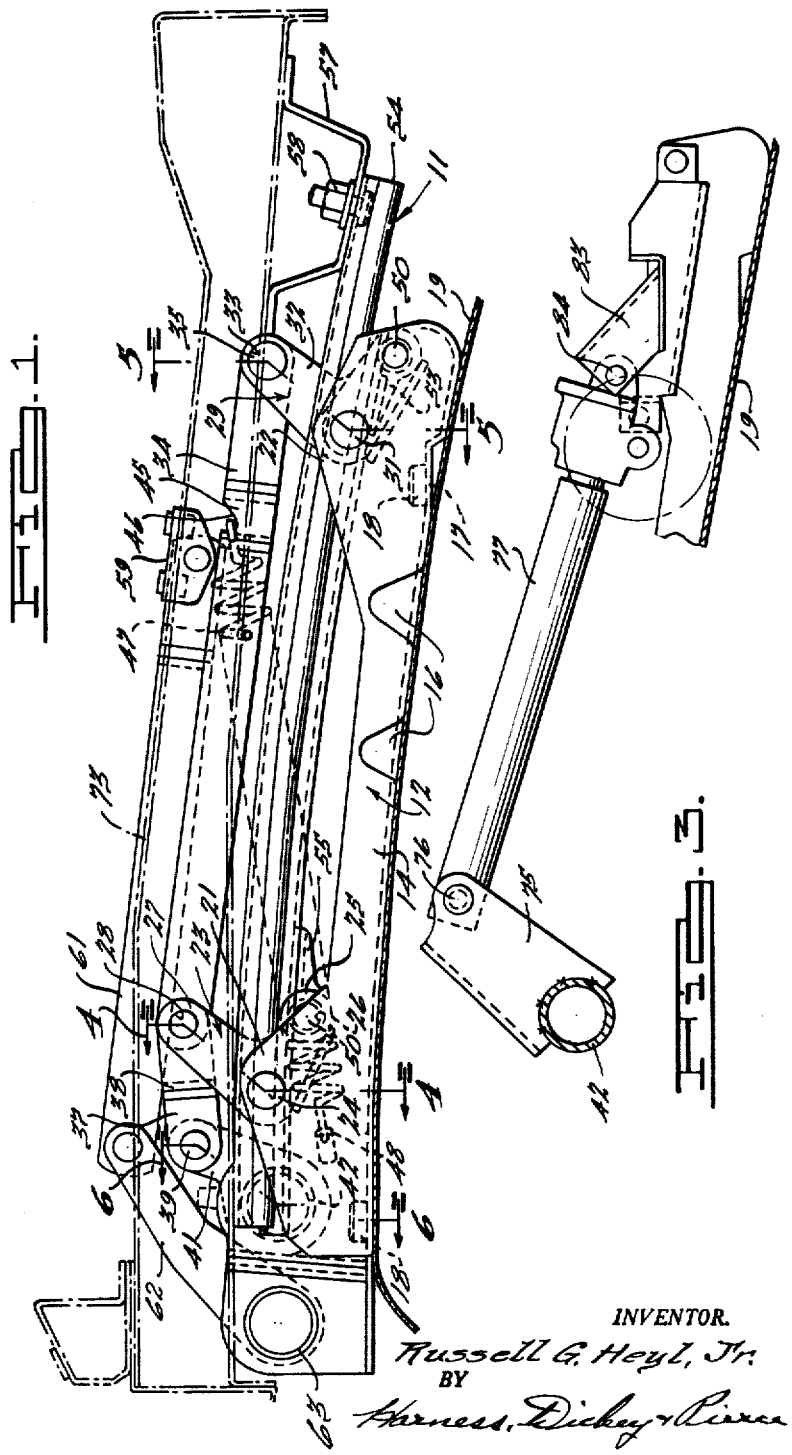

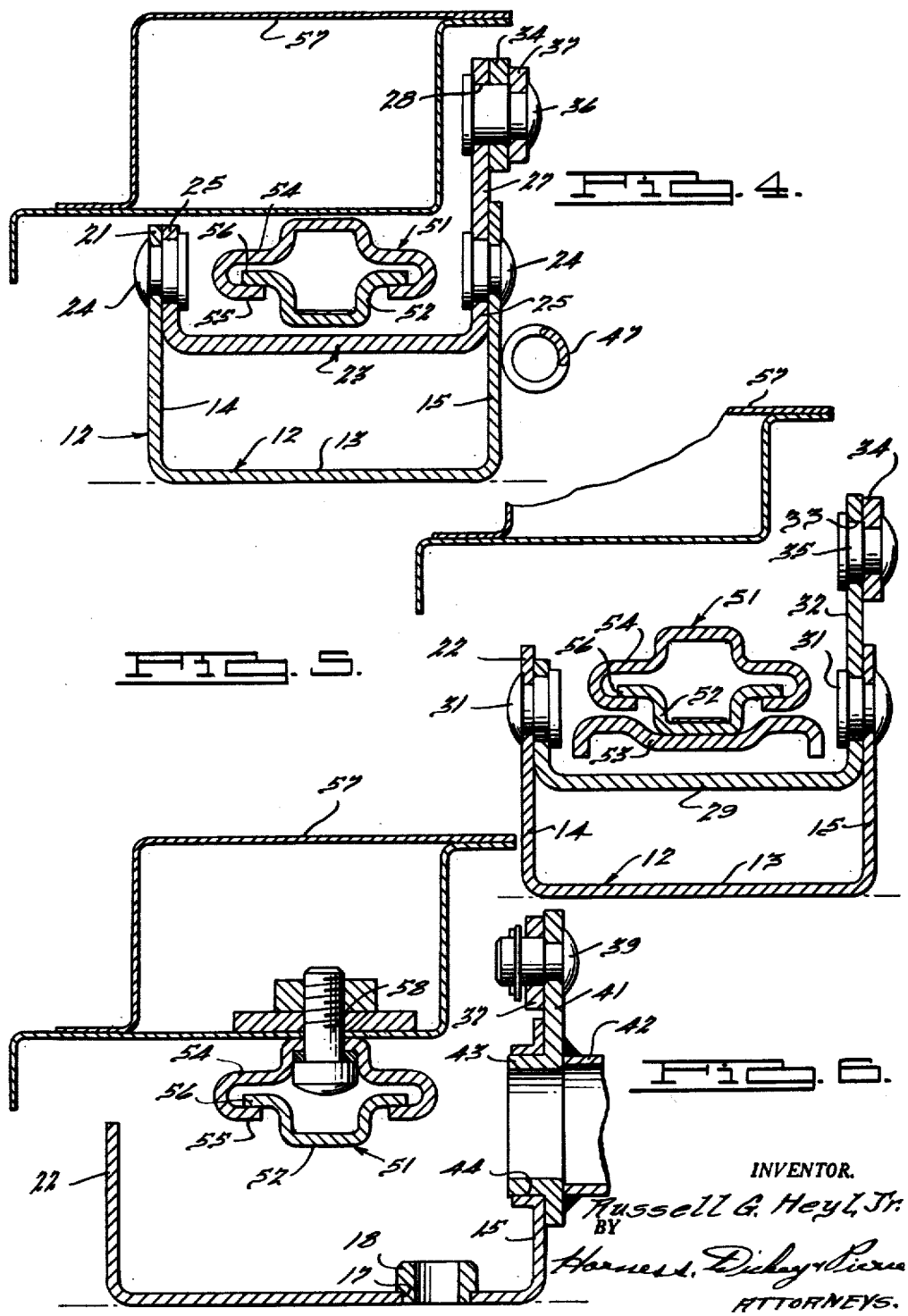

United States Patent Office 3,109,622
Patented Nov. 5, 1963

3,109,622
POWER SEAT TRACK HAVING HORIZONTAL
AND VERTICAL MOVEMENT
Russell G. Heyl, Jr., Birmingham, Mich., assignor to
American Metal Products Company, Detroit, Mich., a
corporation of Michigan
Filed May 17, 1954, Ser. No. 430,267
6 Claims. (Cl. 248—420)

This invention relates to seat supports of the vertical and horizontal adjustable type, and particularly to a self-contained seat support which is adjustable by power means in both vertical and horizontal directions.

In the copending application of Richard J. Williams et al., Serial No. 302,044, filed August 1, 1952, now Patent No. 2,921,621, and assigned to the assignee of the present invention, a seat support is illustrated which is shiftable horizontally and adjustable vertically by power means. In this arrangement, the power means for shifting the seat support horizontally had one end connected to the floor while the other end was connected to the torsion bar.

In accordance with the present invention, the power means, both for adjusting the seat frame vertically and that for adjusting the seat frame horizontally, are connected to the support so as to provide a self-contained unit. The construction is such that the track elements on each side of the seat are extremely rugged and compact, with the base and link portions which support the track members being formed of channel section containing within the width thereof the track members which support the seat and on which the seat is moved forwardly and rearwardly of the vehicle floor. A pair of torsion bars is mounted between the two seat track elements, each being operated by a power unit which is carried by one of the track elements. The rotation of one of the torsion bars by the power unit causes the seat to be moved forwardly and backwardly of the vehicle floor, while the rotation of the other torsion bar causes links to be swung in unison for raising and lowering the seat and for retaining the seat in any desired position.

Accordingly, the main objects of the invention are: to provide a self-contained seat unit having power means mounted thereon which adjusts the seat forwardly and rearwardly and upwardly and downwardly to desired positions; to form a track element from a channel-shaped base member having channel-shaped adjustable links therein on which one part of a longitudinally movable track member is secured which supports the mating member thereon and on which the seat is secured; to interconnect a pair of track elements with a pair of torsion bars and to secure between one of the torsion bars and track element a power operated unit and between the other torsion bar and track element a second power operated unit, with the torsion bars operating the track elements vertically and horizontally depending upon which of the bars is actuated by its respective power unit; and, in general, to provide a self-contained seat supporting track unit which is simple and rugged in construction and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a view in elevation of one element of a seat track embodying features of the present invention;

FIG. 2 is a broken plan view of the seat track illustrated in FIG. 1;

FIG. 3 is a broken sectional view of the seat track illustrated in FIG. 2, as taken from the line 3—3 thereof;

FIG. 4 is an enlarged sectional view of the structure illustrated in FIG. 1, taken on the line 4—4 thereof;

FIG. 5 is an enlarged, broken sectional view of the structure illustrated in FIG. 1, taken on the line 5—5 thereof, and FIG. 6 is an enlarged, broken sectional view of the structure illustrated in FIG. 1, taken on the line 6—6 thereof.

Referring to the drawings, a right-hand track element 10 and a left-hand track element 11, as viewed in FIG. 2, form the main supporting elements for the seat which is mounted thereon. Each of the elements 10 and 11 is similar except for being of the right and left-hand type, so that only the track element 11 will be described in detail. A base member 12 is of channel section having a web 13 and two spaced side flanges 14 and 15. The flanges and web have indented areas 16 which provide strength thereto. The web 13 contains spaced apertures 17 and aligned threaded nuts 18 which are welded or otherwise secured and by which the base member is secured to the floor 19 of the vehicle body. It will be noted from FIG. 1 that the floor and the web of the channel member curve rearwardly and are in mated relation to each other.

The flanges 14 and 15 are extended at 21 and 22 at the forward and rearward ends thereof, as evident from FIG. 1. A channel-shaped link 23 is secured to the extending portions 21, as illustrated in FIGS. 1 and 4, by shouldered rivets 24. The channel-shaped portion of the link is extended to provide spaced arms 25 having aligned apertures 26 therein. On the inside portion of the track, the channel-shaped link 23 has an arm 27 disposed in angular relation to the arms 25 in bell crank relation thereto so that the apertures 28 in the arm 27 move substantially in a horizontal direction as the apertures in the arms 25 move substantially in a vertical direction when the link 23 is rotated counterclockwise, as illustrated in FIG. 1, about the rivet 24. A bell crank type of link 29, which is similar to the link 23, is secured by rivets 31 to the projecting portion 22 of the flanges 14 and 15. The arm 32 of the link 29 has an aperture 33 therein which is connected to a link 34 by a shouldered rivet 35. The opposite end of the link is secured to a rivet 36 which also secures a link 37 to the arm 27 of the link 23, as clearly illustrated in FIG. 4.

The link 37 has an offset portion 38 which aligns its opposite end with an arm 41 to which it is pivoted by a rivet 39. The arm is fixed to a torsion bar 42 in aligned relation to a cylinder portion 43 of the arm which is pivoted within a cylindrical flanged aperture 44 of the flange 15. The link 34 has an offset portion 45 containing a notch 46 in which one end of a spring 47 is secured. The opposite end of the spring is anchored to a finger 48 which is sheared and formed from the flange 15. A pair of relatively movable track members 51 is supported on the brackets 23 and 29. The track members embody a bottom member 52 having hinged brackets 53 mounted at the forward and rearward ends and being supported on pins 50 which extend through the apertures 26 in the arms 25 of the links 23 and 29 in pivoted relation thereto. An upper member 54 of the track member encompasses ball bearings, not herein illustrated, which permit the track member 54 to move longitudinally of the track member 52. The two members are retained in unit relation by having reversely bent flange portions 55 of the member 54 encompass laterally extending flanges 56 at the side of the member 52. As is evident from FIG. 6, the member 54 is secured to the seat frame 57 by a plurality of screws 58.

Laterally extending brackets 59 are provided on the seat frame 57 and are connected by links 61 to arms 62 which are secured to a torsion bar 63 extending between the right and left-hand base members 12 of the seat tracks. The cylindrical portions extending from the one side of the arms 62 are pivoted in the extending portion of the flanges 15 in the same manner as the cylindrical portions 43 of the arms 41 on the torsion bar 42 are secured to the flanges 15, as illustrated in FIG. 6. An arm 64 is secured to the torsion bar 63 connected by a pin 65 to one end of an extensible jack type power unit 66 which is operated by a motor 67. A bracket 68 is secured to the flange 15 of the base member 11 by rivets 69. A channel-shaped element 71 extends upwardly from the bracket 68 and is secured by a pivot 72 to the opposite end of the extensible element 66 of the power unit.

When the motor 67 is energized, the extensible portion 66 of the unit elongates to rock the arms 62 forwardly at both ends of the torsion bar 63, to thereby operate the links 73 which are pivoted to the ends of the arms 62 and the brackets 59 to thereby pull the seat frame 57 and the track members 54 forwardly. When the extensible portion 66 is retracted, the arms 62 are rocked rearwardly, thereby moving the links 73, the frame 57, and track members 54 rearwardly to a desired adjusted position. When the motor 67 is de-energized, the track members 54 are locked in adjusted position without the necessity of employing any additional locking means.

The torsion bar 42, having an arm 41 near each end, has a bracket 75 thereon which is secured by pins 76 to an extensible portion 77 of a power unit which is operated by a motor 78. When the portion 77 is extended, the arms 41 are rocked forwardly, thereby drawing the links 37 forwardly and rotating the links 23 and 29 in a counter-clockwise direction about the rivets 24 and 31. Both of the brackets move in unison in view of the fact that they are joined together by the link 34. This forward movement of the links 34 is assisted by the tension in the spring 47 during the raising operation of the seat frame 57. It will be noted that during this movement the link portion 28 moves substantially in a horizontal direction while the pins 54 move substantially in a vertical direction, thereby obtaining the maximum degree of lift to the seat frame for a minimum horizontal movement of the links 34.

By providing a lost motion connection between one of the pins 50 of each of the track elements at the forward or rearward part of the seat, the portion 25 of the links may be of different lengths so that a greater amount of lift may be provided at one or the other end of the track elements when desirable. Such a lost motion connection may be produced either by a slot or by an additional link, as disclosed and claimed in the patent to Haberstump No. 2,609,029, issued September 2, 1952, and assigned to the assignee of the present invention.

A bracket 79 is secured to the channel base member of the right-hand track, as viewed in FIG. 2, being secured thereto by rivets 81. The bracket has a channel-shaped upward projection 83 to which the opposite end of the extensible member 77 is secured by a pin 84. It will thus be seen that the resulting seat supporting structure is entirely self-contained, having both operating members supported directly to the base members of the right and left-hand track elements. This permits the entire mechanism to be accurately adjusted and tested before it is mounted on the floor of the automobile body. By employing channel-shaped base members and channel-shaped links, compact track elements are provided in which all of the elements are balanced so that binding is eliminated, assuring smooth operation of all of the parts. The horizontal adjustable track members on which the seat is supported are carried by the channel-shaped links so that all of the load will be exerted downwardly centrally of each track element. By interconnecting the two extensible power units to the torsion bars, the angular adjustment of the bars produces the simultaneous movement of the seat frame in either horizontal or vertical adjustment. By mounting brackets on the base members which support the opposite end of the extensible power units, the entire track assembly becomes a self-contained unit requiring only the base members of each track element to be bolted to the vehicle body floor.

What is claimed is:

1. A seat supporting structure comprising a pair of spaced track units, each track unit having an upwardly presenting channel-shaped base member, a pair of upwardly presenting channel-shaped bell crank links consisting of angularly disposed arms having apertures near the ends and in the mid-area, the aperture at the mid-area of one of the links being pivoted at the forward end, the mid-aperture of the other link being pivoted at the rearward end of said channel base member, relatively movable track members, hinge brackets extending downwardly from one of the track members, means pivotally connecting the hinge brackets to the apertures in the ends of one of the arms of said links centrally of the length of the base members and an operating link interconnecting the apertures of the upper arms of said links.

2. A seat supporting structure comprising a pair of spaced track units, each track unit having an upwardly presenting channel-shaped base member, a pair of upwardly presenting channel-shaped bell crank links, one pivoted at the forward end the other pivoted at the rearward end of said channel base member, and relatively movable track members pivotally supported on said links centrally of the base members, a pair of torsion bars disposed between the base members and pivoted thereon near the forward ends therof, arms on said torsion bars, links interconnecting the arms of one torsion bar to said bell crank links, links interconnecting the arms of the other torsion bar to one of said track members, and means for angularly adjusting said torsion bars.

3. A seat supporting structure comprising a pair of spaced track units, each track unit having an upwardly presenting channel-shaped base member, a pair of upwardly presenting channel-shaped bell crank links, one pivoted at the forward end the other pivoted at the rearward end of said channel base member, and relatively movable track members pivotally supported on said links centrally of the base members, a pair of torsion bars disposed between the base members and pivoted thereon, arms on said torsion bars, links interconnecting the arms of one torsion bar to said bell crank links, links interconnecting the arms of the other torsion bar to one of said track members, a power unit pivoted to one of said base members and to an arm of one of said torsion bars, and a power unit pivoted to the other of said base members and an arm of the other torsion bar.

4. A seat supporting structure comprising a pair of spaced track units, each track unit having an upwardly presenting channel-shaped base member, a pair of upwardly presenting channel-shaped bell crank links, one pivoted at the forward end the other pivoted at the rearward end of said channel base member, and relatively movable track members pivotally supported on said links centrally of the base members, a pair of torsion bars disposed between the base members and pivoted thereon, arms on said torsion bars, links interconnecting the arms of one torsion bar to said bell crank links, links interconnecting the arms of the other torsion bar to one of said track members, extensible means between one of said base members and an arm of one of said torsion bars, and extensible means between the other of said base members and an arm of the other torsion bar.

5. In a seat supporting mechanism, a pair of spaced track units, each track unit having a channel-shaped base member, a pair of channel-shaped bell crank links pivoted to said base member one near each end thereof, a pair of relatively longitudinally movable track members pivoted to said links and disposed centrally of said base member, said links having upwardly extending arms, a link interconnecting said link arms, a pair of torsion bars extending between and pivoted to said track units, arms on said torsion bars, a link connecting a pair of the arms of one torsion bar to one of said link arms of each track unit for raising and lowering the seat, a projection on each of the base members, a power operated unit pivoted to a projection and to an arm of said one torsion bar, links connected to the arms of the other torsion bar and one of said track members of each track unit for moving the seat forwardly and rearwardly, and a power operating unit pivoted to the projection of the other base member and to an arm of said other torsion bar.

6. In a seat supporting mechanism, a pair of spaced track units, each track unit having a channel-shaped base member, a pair of channel-shaped bell crank links pivoted to said base member one near each end thereof, a pair of relatively longitudinally movable track members pivoted to said links and disposed centrally of said base member, said links having upwardly extending arms, a link interconnecting said link arms, a pair of torsion bars extending between and pivoted to said track units, arms on said torsion bars, a link connecting a pair of the arms of one torsion bar to one of said link arms of each track unit for raising and lowering the seat, a projection on each of the base members, a power operated unit pivoted to a projection and to an arm of said one torsion bar, links connected to the arms of the other torsion bar and one of said track members of each track unit for moving the seat forwardly and rearwardly, and a power operating unit pivoted to the projection of the other base member and to an arm of said other torsion bar, said bell crank links having the upwardly extending arm disposed in less than 90° relation to the channel portion so that the end of the arm moves substantially in a horizontal direction as the end of the channel portion moves substantially in a vertical direction when the links are angularly adjusted.

References Cited in the file of this patent

UNITED STATES PATENTS

| | | |
|---|---|---|
| 1,664,129 | Pallenberg | Mar. 27, 1928 |
| 2,260,032 | Kaiser et al. | Oct. 21, 1941 |
| 2,264,860 | Saunders | Dec. 2, 1941 |
| 2,500,744 | Beem | Mar. 14, 1950 |
| 2,641,305 | Oishei | June 9, 1953 |
| 2,647,558 | Rappl | Aug. 4, 1953 |
| 2,684,108 | Rappl | July 20, 1954 |
| 2,789,622 | Dingman et al. | Apr. 23, 1957 |

FOREIGN PATENTS

| | | |
|---|---|---|
| 64,726 | Germany | May 11, 1914 |
| 490,729 | Germany | Feb. 1, 1930 |
| 976,199 | France | Oct. 25, 1950 |

UNITED STATES PATENT OFFICE
CERTIFICATE OF CORRECTION

Patent No. 3,109,622                                       November 5, 1963

Russell G. Heyl, Jr.

It is hereby certified that error appears in the above numbered patent requiring correction and that the said Letters Patent should read as corrected below.

Column 6, after line 21, insert:

2,809,689     Garvey et al.--------Oct. 15, 1957

Signed and sealed this 15th day of September 1964.

(SEAL)
Attest:

ERNEST W. SWIDER                                  EDWARD J. BRENNER
Attesting Officer                                       Commissioner of Patents